United States Patent
Murphy et al.

(10) Patent No.: US 6,176,899 B1
(45) Date of Patent: Jan. 23, 2001

(54) WATER TREATMENT PROCESS FOR NEUTRALIZING GAS SUPERSATURATION

(75) Inventors: Andrew P. Murphy, Littleton, CO (US); Robert Lee Riley, La Jolla, CA (US); Scott Roy Irvine, Littleton, CO (US)

(73) Assignee: The United States of America as represented by the Secretary of the Interior, Washington, DC (US)

( * ) Notice: Under 35 U.S.C. 154(b), the term of this patent shall be extended for 0 days.

(21) Appl. No.: 09/161,603

(22) Filed: Sep. 17, 1998

(51) Int. Cl.[7] ................................................... B01D 19/00
(52) U.S. Cl. ................................................ 95/263; 95/265
(58) Field of Search ............................. 95/263, 264, 265

(56) References Cited

U.S. PATENT DOCUMENTS

| | | | |
|---|---|---|---|
| 4,488,508 | * | 12/1984 | Heideman ............................ 210/170 |
| 5,034,164 | * | 7/1991 | Semmens . |
| 5,254,253 | * | 10/1993 | Behrman . |
| 5,316,682 | * | 5/1994 | Keyser . |
| 5,549,828 | * | 8/1996 | Ehrlich ................................ 210/170 |
| 5,632,932 | * | 5/1997 | Harris . |
| 5,674,433 | * | 10/1997 | Semmens ............................... 261/37 |
| 5,772,731 | * | 6/1998 | Harrison ................................ 95/263 |

* cited by examiner

Primary Examiner—Chester T. Barry
(74) Attorney, Agent, or Firm—E. Philip Koltos

(57) ABSTRACT

A method of degassing a volume of supersaturated liquid is provided which comprises introducing a plurality of microbubbles of gas substantially near the bottom of the volume of supersaturated liquid so that the microbubbles percolate up through the volume of supersaturated liquid to thereby effect removal of dissolved gas in the volume of the supersaturated liquid at the top of the volume. In one embodiment, the step of introducing microbubbles comprises introducing the microbubbles by recirculating deionized water through a hollow fiber microfiltration membrane. In another embodiment, the step of introducing microbubbles comprises introducing the microbubbles through a pipe from the turbine of a dam. In most applications, the volume of supersaturated liquid is water and the microbubbles of gas comprise air. The volume of supersaturated water advantageously comprises a volume of a river, lake or stream which is near a dam with a turbine.

12 Claims, 1 Drawing Sheet

WATER TREATMENT PROCESS FOR NEUTRALIZING GAS SUPERSATURATION

FIELD OF THE INVENTION

The present invention relates to methods and processes for controlling and neutralizing gas supersaturation in bodies of water, such as aquariums, ponds, tanks, rivers, lakes and streams.

BACKGROUND OF THE INVENTION

Federal, state and local governments have recognized a correlation between fish kills and gas supersaturation at dams, rivers, lakes and streams. Therefore, mandatory total dissolved gas levels have been set. Control of gas supersaturation can benefit the fisheries industry and protect the aquatic environment. Although a number of methods of controlling gas supersaturation are known, these methods suffer various disadvantages as discussed below, and a reasonably low-cost treatment is needed to control gas supersaturation at such dams, rivers, lakes and streams.

One known method of controlling gas supersaturation is dam modification. Dam designers can control variables such as shape of hydraulic structures, rates of discharge and methods of discharge to alleviate the gas supersaturation problem. For example, the Army Corps of Engineers is constructing "flip-lips" on dam spillways to control the rates of discharge and methods of discharge. The major disadvantage of this technique is that such dam modifications involve considerable cost.

Another method of controlling gas supersaturation is gas sparging. Excess air can be removed from water by sparging with a less soluble gas such as helium. The major disadvantage of this technique is the expense of helium or whatever other gas is used, particularly when large quantities of water are treated.

Another method of controlling gas supersaturation is vacuum degassing. Excess air can be removed from water by allowing the water to spill into tanks under reduced pressure, thereby driving the air from the water out into the gas phase. The major disadvantages of this technique are the costs associated with obtaining the necessary equipment, modifications needed to an existing site, and the electric power required to run a vacuum pump.

Another method of controlling gas supersaturation is turbulent aeration. Excess air can be removed from water by, for example, allowing the water to flow into rocks. The splashing action increases the air-to-water interface area, thereby causing the excess air to leave the system. This method can be used to control gas supersaturation in a river, for example. A major disadvantage of this method is the engineering difficulty involved. Moreover, in some cases, such a system may actually add air to the water. Other disadvantages of this method include navigational problems on a river presented by the materials added to the river to produce the splashing action.

Currently used methods of degassing a body of water include packed towers, diffused aeration, spray nozzles, tray aerators and cascade air stripping. In general, these methods are used to remove a gas or contaminant from water or to aerate water. Diffused aeration is of particular interest insofar as the present invention is concerned. This technology involves bringing air bubbles in contact with a volume of water so that the bubbles pass through the volume of water, collecting excess gas. Conventional diffused aeration employs large air bubbles, typically on the order of $10^{-2}$ m in diameter. The main disadvantages of this technology are the need for large volumes of air due to the large bubble size and the long reaction times required. Because large volumes of air are required, diffused aeration is unattractive for degassing large volumes of water. Because long reaction times are needed, the method defeats the purpose of degassing the water in a short time period in order to prevent damage to aquatic organisms.

SUMMARY OF THE INVENTION

The process of the present invention provides a reasonably low-cost treatment for controlling gas supersaturation at dams, rivers, lakes and streams. A key feature of the invention is the introduction of microbubbles of air, i.e., bubbles ranging in diameter from $10^{-8}$ m to $10^{-4}$ m, into the volume of water to be treated. Microbubbles of air this size provide more interfacial surface area than the larger bubbles used in known degassing methods, and such microbubbles also rise more slowly through the volume of water to be treated than do bubbles of traditional degassing methods. These features allow a volume of water to be degassed using a lower volume of air and shorter reaction time than are required by traditional degassing methods.

In accordance with the invention, a method of degassing a volume of supersaturated liquid is provided which comprises introducing a plurality of microbubbles of gas, of a diameter in the range from $10^{-8}$ m to $10^{-4}$ m, substantially near the bottom of the volume of supersaturated liquid so that the microbubbles percolate up through the volume of supersaturated liquid to thereby effect removal of dissolved gas in the volume of supersaturated liquid at the top of the volume.

In the preferred embodiment of the invention, the step of introducing microbubbles comprises introducing the microbubbles by recirculating water through a hollow fiber microfiltration membrane.

In an alternative preferred embodiment, the step of introducing microbubbles comprises introducing the microbubbles through a pipe from the turbine of a dam.

Preferably, the volume of supersaturated liquid comprises water and the microbubbles of gas comprise air.

In a preferred embodiment, the volume of supersaturated water comprises a volume of a river, lake or stream which is substantially near a dam with a turbine.

Other features and advantages of the invention will be set forth in, or apparent from, the detailed description of the preferred embodiments of the invention which is found herein below.

DETAILED DESCRIPTION OF THE PREFERRED EMBODIMENTS

Figure 1:
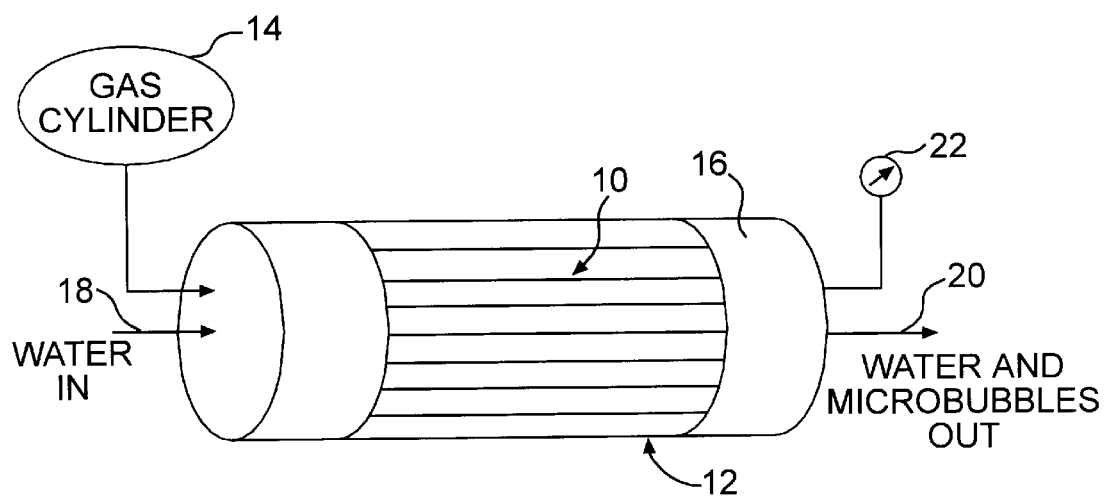
FIG. 1 is a schematic side elevational view of a first embodiment of the invention.

As indicated above, in one preferred embodiment of the present invention, microbubbles of gas are generated by recirculating water through a hollow fiber microfiltration membrane. This embodiment is illustrated in FIG. 1, wherein the hollow microfiltration membrane is indicated at 10 and forms part of a hollow fiber tube 12. The hollow fiber tube 12 is pressurized from the inside with air from a gas cylinder 14 while the other end of the hollow fiber tube 12 is plugged off by a plug 16 to prevent the escape of air. Water from inlet 18 is circulated inside the microfiltration membrane 10 on the outside of the hollow fiber tube 12. The pore size through the microfiltration membrane 10 is $10^{-7}$ m, thus generating microbubbles of air, at outlet 20, which are $10^{-7}$ m in diameter. An air gauge 22 enables monitoring of the process.

Figure 2:
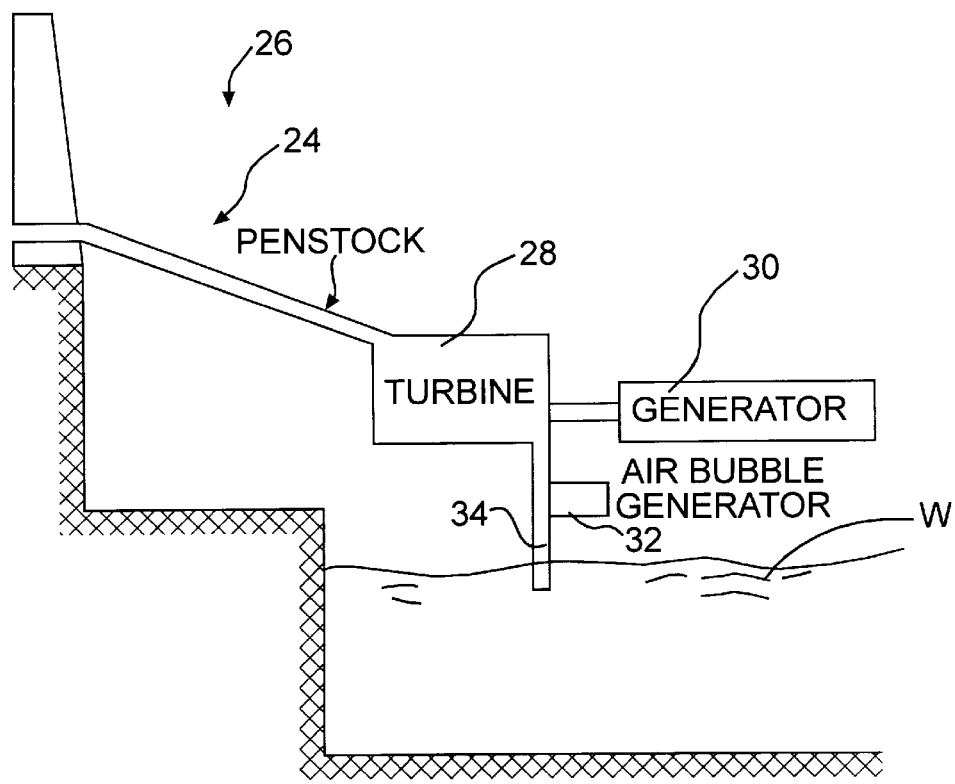
FIG. 2 is a schematic side elevational view of a second embodiment of the invention.

Although the method described with reference to FIG. 1 is advantageous, it is only one of a number of methods which may be employed to generate microbubbles of gas in accordance with of the present invention. In further embodiment illustrated in FIG. 2 which shows the penstock portion 24 of a hydroelectric dam 26 including a turbine 28 and a generator 30 and in which a volume of water W, e.g., a volume of a river or lake, is located near to dam 26, a microbubbler generator 32 is used in combination with piping 34 from the turbine 28 on the dam 26 to generate the required microbubbles of gas. In a further embodiment, aerators (not shown) can also be designed to generate these microbubbles of gas.

EXAMPLE 1

The following experiment demonstrates the utility of the preferred embodiment of the present invention illustrated in the drawings. Two 1 L glass cylinders were filled with supersaturated deionized water. After waiting five to ten minutes, the water in both cylinders was measured at 119.2% saturation and 20.9° C. In the meantime, water from hollow fiber membranes corresponding to microfiltration membrane 10 of the drawings was measured at 104.4% saturation and 21.0° C. 100 mL of hollow fiber membrane water was then added to the bottom of the second cylinder. After waiting three minutes and 30 seconds, the water in the first cylinder was measured at 117.6% saturation and 20.9° C., while the water in the second cylinder was measured at 102.8% saturation and 20.9° C. This indicates that the hollow fiber membrane water clearly expedited the degassing process in the second cylinder.

EXAMPLE 2

The following experiment further demonstrates the utility of the preferred embodiment of the present invention. During the experiment, Denver tap water (pH 7.9, TDS 199 mg/L) was used in place of deionized water. Two 1 L glass cylinders were filled with supersaturated tap water. After waiting five to ten minutes, the water in both cylinders was measured at 117.9% saturation and 19.9° C. 30 mL of hollow fiber membrane water was then added to the bottom of the second cylinder. After waiting two minutes and 37 seconds, the water in the first cylinder was measured at 117.9% saturation and 19.9° C., while the water in the second cylinder was measured at 101.7% saturation and 19.9° C. Once again, the hollow fiber membrane water substantially expedited the degassing process in the second cylinder.

EXAMPLE 3

The following experiment demonstrates the utility of the preferred embodiment of the present invention as compared with traditional degassing methods employing larger bubbles. A 1 L glass cylinder was filled with Denver tap water which was measured at 112.5% saturation and 22.9° C. A bubbler with pore size of $4 \times 10^{-5}$ m and dimensions of 0.5 inch by 0.187 inch was placed in the bottom of the cylinder with air flow at 3.64 L/min. After waiting ten minutes, the water in the cylinder was measured at 104.2% saturation and 22.9° C. Thus, even though the bubbles were in contact with the water for a longer period of time, the water in the cylinder remains at a higher saturation level than the water in the second cylinder in the preceding experiment. Furthermore, this experiment required the use of more than 20,000 times the amount of air used in the preceding experiment. This demonstrates the advantages of the smaller bubbles used in the preferred embodiment of the present invention over the larger bubbles of traditional degassing methods.

EXAMPLE 4

The following experiment demonstrates the utility of the preferred embodiment of the present invention. During the experiment, Grand Coulee water from Lake Roosevelt was used. Two glass cylinders were filled with water from Lake Roosevelt and measured at 115.8% saturation and 20.8° C. Hollow fiber membrane water was added to the bottom of the second cylinder. After waiting four minutes and eight seconds, the water in the first cylinder was measured at 102.0% saturation and 20.8° C. As before, the hollow fiber membrane water expedited the degassing process in the second cylinder.

Although the present invention has been described to specific exemplary embodiments thereof, it will be understood by those skilled in the art that variations and modifications can be effected in these exemplary embodiments without departing from the scope and spirit of the invention.

What is claimed is:

1. A method of degassing a volume of supersaturated liquid, the volume having a top and a bottom, said method comprising introducing a plurality of microbubbles of gas, of a diameter in a range of $10^{-8}$ m to $10^{-4}$ m, substantially near the bottom of the volume of supersaturated liquid so that the microbubbles percolate up through the volume of supersaturated liquid and effect removal of dissolved gas in the volume of supersaturated liquid at the top of the volume.

2. The method of claim 1, wherein the step of introducing microbubbles comprises introducing the microbubbles by recirculating water through a hollow fiber microfiltration membrane.

3. The method of claim 1, wherein the microbubbles are substantially $10^{-7}$ m in diameter.

4. The method of claim 1, wherein the volume of supersaturated liquid comprises water and the microbubbles of gas comprise air.

5. A method of degassing a volume of supersaturated liquid, the volume having a top and a bottom, said method comprising introducing a plurality of microbubbles of gas, of a diameter in a range of $10^{-8}$ m to $10^{-4}$ m, substantially near the bottom of the volume of supersaturated liquid so that the microbubbles percolate up through the volume of supersaturated liquid and effect removal of dissolved gas in the volume of supersaturated liquid at the top of the volume, wherein the microbubbles of gas comprise air, and wherein the volume of supersaturated liquid comprises a volume of water of a river, lake or stream, and wherein the river, lake or stream is substantially near a dam having a turbine.

6. The method of claim 5, wherein the introducing of the microbubbles comprises introducing the microbubbles through a pipe from the turbine.

7. The method of claim 5, wherein the introducing of the microbubbles comprises introducing the microbubbles by recirculating deionized water through a hollow fiber microfiltration membrane.

8. The method of claim 5, wherein the microbubbles are substantially $10^{-7}$ m in diameter.

9. A method of degassing a volume of supersaturated liquid, the volume having a top and a bottom, said method comprising introducing a plurality of microbubbles of gas, of a diameter in a range of $10^{-8}$ m to $10^{-4}$ m, substantially near the bottom of the volume of supersaturated liquid so that the microbubbles percolate up through the volume of supersaturated liquid and effect removal of dissolved gas in the volume of supersaturated liquid at the top of the volume, wherein the microbubbles of gas comprise air, and wherein the volume of supersaturated liquid comprises a volume of water of a river, lake or stream.

10. The method of claim 9, wherein the introducing of the microbubbles comprises introducing the microbubbles through a pipe from a turbine.

11. The method of claim 9, wherein the introducing of the microbubbles comprises introducing the microbubbles by recirculating deionized water through a hollow fiber microfiltration membrane.

12. The method of claim 9, wherein the microbubbles are substantially $10^{-7}$ m in diameter.

* * * * *